United States Patent
Wang et al.

(10) Patent No.: US 10,293,295 B2
(45) Date of Patent: May 21, 2019

(54) SYSTEM AND METHOD FOR FILTERING A GAS-SOLIDS MIXTURE

(71) Applicant: Air Products and Chemicals, Inc., Allentown, PA (US)

(72) Inventors: Guoqiang Wang, Beijing (CN); Chii-King Wong, Beijing (CN); Lucien Zalman, Beijing (CN)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 16/062,697

(22) PCT Filed: Dec. 23, 2015

(86) PCT No.: PCT/CN2015/098396
§ 371 (c)(1),
(2) Date: Jun. 15, 2018

(87) PCT Pub. No.: WO2017/107092
PCT Pub. Date: Jun. 29, 2017

(65) Prior Publication Data
US 2018/0361297 A1    Dec. 20, 2018

(51) Int. Cl.
*B01D 46/00* (2006.01)
*B01D 46/24* (2006.01)

(52) U.S. Cl.
CPC ..... *B01D 46/2407* (2013.01); *B01D 46/0008* (2013.01); *B01D 46/0068* (2013.01);
(Continued)

(58) Field of Classification Search
CPC ................... B01D 2265/06; B01D 2201/0415–2201/0492; B01D 2267/30;
(Continued)

(56) References Cited

U.S. PATENT DOCUMENTS 3,691,736 A    9/1972 Neumann
3,844,749 A   10/1974 Carter
(Continued)

FOREIGN PATENT DOCUMENTS

CN    1642617 A     7/2005
CN    201329226    10/2009
(Continued)

OTHER PUBLICATIONS

Chinese International Search Report and Written Opinion of the International Searching Authority, dated Sep. 27, 2016, for PCT/CN2015/098396.

*Primary Examiner* — T. Bennett McKenzie
(74) *Attorney, Agent, or Firm* — Bryan C. Hoke, Jr.

(57) ABSTRACT

A system for filtering a gas-solids mixture, comprises: a housing; a separating body dividing the housing in a raw gas chamber and a clean gas chamber, the raw gas chamber being accessible via an inlet for the gas-solids mixture and the clean gas chamber comprising an outlet for discharging a cleaned gas; a number of filter elements suspended from the separating body; lower ends of the filter elements being connected to a support grid, the support grid comprising a number of arms; one or more cleaning elements provided on the arms of the support grid for cleaning thereof.

19 Claims, 6 Drawing Sheets

(52) U.S. Cl.
CPC ..... *B01D 46/0071* (2013.01); *B01D 46/0075* (2013.01); *B01D 2201/0415* (2013.01); *B01D 2265/06* (2013.01); *B01D 2267/30* (2013.01); *B01D 2267/60* (2013.01)

(58) Field of Classification Search
CPC .......................... B01D 2267/60; B01D 46/00; B01D 46/0008; B01D 46/0057–46/0076; B01D 46/2407
USPC ............. 55/282–305, 341.1–341.7, 378, 379
See application file for complete search history.

(56) References Cited

U.S. PATENT DOCUMENTS

| | | | |
|---|---|---|---|
| 4,032,307 A * | 6/1977 | Sommerfeld | B01D 46/0075 15/352 |
| 4,645,520 A | 2/1987 | Huttlin | |
| 2010/0236204 A1 | 9/2010 | Bouhanna et al. | |
| 2012/0012003 A1* | 1/2012 | Dries | B01D 45/12 95/268 |

FOREIGN PATENT DOCUMENTS

| | | |
|---|---|---|
| CN | 102755791 A | 10/2012 |
| CN | 103585836 A | 2/2014 |

* cited by examiner

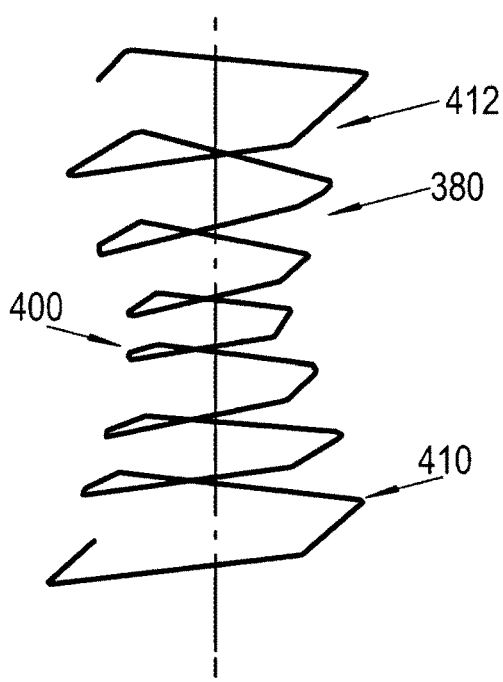
Fig.7
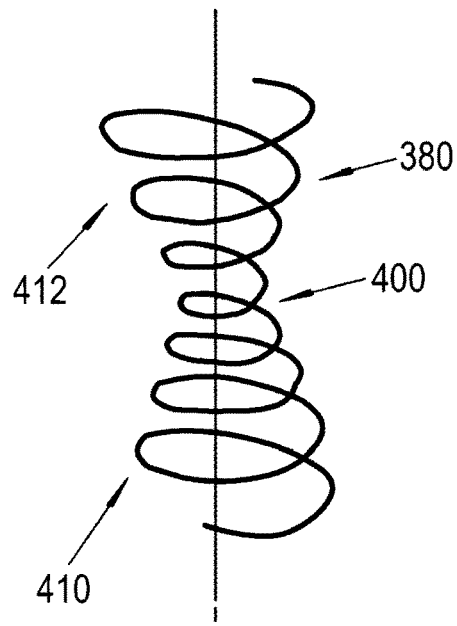
Fig.8
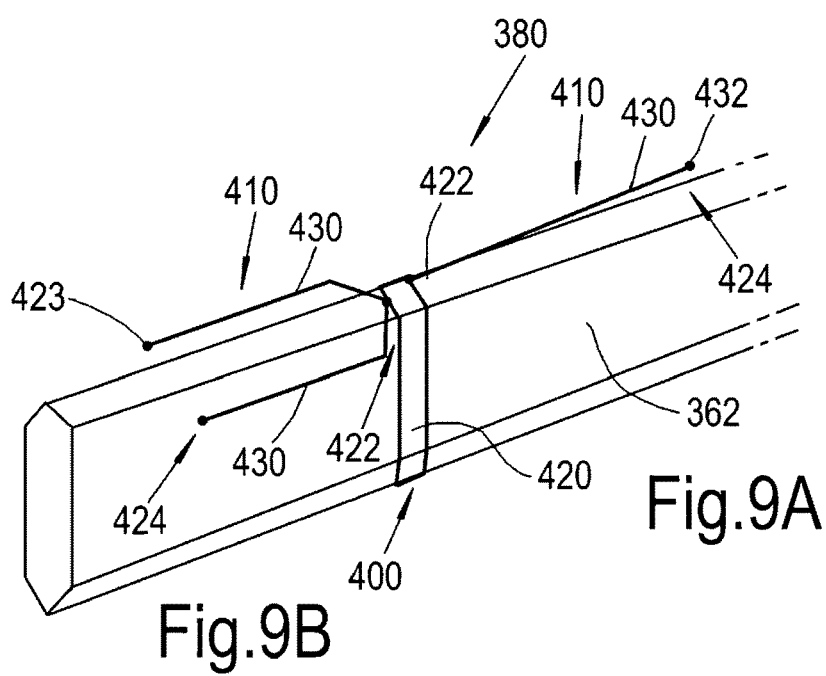
Fig.9A
Fig.9B

SYSTEM AND METHOD FOR FILTERING A GAS-SOLIDS MIXTURE

The present invention relates to a system and a method for filtering a gas-solids mixture. The gas-solids mixture may comprise syngas produced by a gasification system.

Gasification systems typically include a reactor or gasifier to convert carbonaceous materials into a mixture of carbon monoxide (CO) and hydrogen (H2). The mixture may also comprise some carbon dioxide (CO2). This is achieved by reacting the materials at elevated temperatures (typically exceeding 700° C.), without combustion, with a controlled amount of oxygen and/or steam. The gasification reaction may be referred to as partial combustion or partial oxidation. The resulting gas mixture may be referred to as syngas, synthesis gas, synthetic gas, or producer gas, and is itself a fuel.

The syngas may be used, for instance, for the production of synthetic fuels (such as diesel, gasoline, or synthetic methane), chemicals (such as methanol or ammonia.), waxes, or power (typically electricity). For example, an integrated gasification combined cycle (IGCC) power plant includes one or more gasifiers to produce syngas.

The carbonaceous materials of the feedstock may include any carbonaceous feedstock, such as pulverized coal, biomass or oil residue. Oil residue typically refers to liquid hydrocarbons, typically heavy hydrocarbon oils, for instance heavy crude oils or crude residue. Pulverized coal and biomass are examples of solid carbonaceous materials.

The feedstock is partially oxidised in a gasification reactor of a gasification unit. During the process, the temperature in the gasification reactor can for instance be as high as about 1300 to 1600° C., while the operating pressure may typically be about 3 to 6.5 MPa.

The resulting syngas may include impurities, such as tar or ash. The syngas may be directed through a quench unit to cool the syngas to a saturation temperature. The quench unit may also remove a part of the impurities as a slag.

The ash or solids content of the syngas typically depends on the feedstock. For instance the gasification of coal will typically produce more ash than can be removed with a quench unit alone. Also, a subsequent process may require cleaned syngas. A filtration unit may receive the syngas from the quench unit for further cleaning thereof, and for the removal of fly ash.

US20140047806 discloses a high-temperature and high-pressure fly ash filter system for cleaning a tar or ash containing gas. The filter system comprises a housing which essentially consists of a cylindrical wall portion which is closed at its upper end by a dome-shaped cover and connected at its lower end to a dust collector with a conical shape. The housing is divided into a raw gas chamber and a clean gas chamber by a tube sheet which spans across the whole cross-section of the cylindrical wall portion at its upper end. The raw gas chamber is accessible via a feed gas inlet through which raw gas can be introduced into the raw gas chamber. The dome-shaped portion of the housing comprises a clean gas outlet through which clean gas may be discharged. The tube sheet comprises a plurality of openings which accommodate a plurality of candle-shaped filter modules.

A disadvantage of the system of US20140047806 is that lower ends of the filter modules have a tendency to vibrate during use. These vibrations may be so severe, that adjacent filter modules engage each other, potentially damaging or breaking the filter modules.

In an improvement, for instance included in the Herding® ALPHA filter element, sold by Herding Filtration L.L.C., Waterford, USA, the lower ends of the filter modules may be connected to a support grid. This fixates the lower ends of the modules, and thus prevents damage by vibration. However, during use, ash will accumulate on the support structure, and at some point starts to block the lower ends of at least some of the filter elements, requiring an operational shut down for maintenance and manual cleaning of the support structure.

It is an object of the invention to provide an improved system and method for gas filtering.

The invention provides a system for filtering gas, comprising a gas-solids mixture, the system comprising:
a housing;
a separating body dividing the housing in a raw gas section and a clean gas section, the raw gas chamber being accessible via an inlet for the gas-solids mixture and the clean gas chamber comprising an outlet for discharging a cleaned gas;
a number of filter elements suspended from the separating body;
lower ends of the filter elements being connected to a support grid, the support grid comprising a number of arms; and
one or more cleaning elements provided on the arms of the support grid for cleaning thereof.

During operation of the filter, the cleaning elements remove at least part of the solids accumulation on the support grid. The cleaning elements can be dimensioned such that the solids accumulation never exceeds a threshold, obviating blockage of the lower ends of the filter modules. The filter of the disclosure can operate continuously for a longer period, limiting operational expenditure.

In an embodiment, the cleaning elements are adapted to vibrate to remove accumulation of solids.

In another embodiment, the cleaning elements comprise helical springs wound around the arms of the support grid. The helical springs may be round, square or rectangular in cross section. In an embodiment, subsequent windings of the helical springs have an increasing diameter.

The cleaning devices may comprise a fixation section for fixating the respective cleaning device with respect to the support grid, and one or more vibration extensions connected to the fixation section for vibrating with respect to the support grid. The vibration sections may comprise helically wound sections. The helically wound sections can have an increasing diameter in a direction away from the fixation section. The fixation section may comprise a band.

The vibration extensions may comprise elongate vibration elements, having a first end connected to the band. Optionally, an end of the elongate vibration elements may be provided with a weight.

The cleaning devices can be adapted to limit accumulation of solids on the support grid to a maximum threshold level, by tuning one or more parameters selected from the group of: flow rate of the gas-solids mixture; energy of the mechanical and/or hydraulic impulse; vibrations in the support grid resulting from the impulse; frequency of repeating the mechanical and/or hydraulic impulse; number of mechanical and/or hydraulic impulses at a time; and time period of the mechanical and/or hydraulic impulse.

According to another aspect, the invention provides a method for filtering a gas mixture, the method comprising the steps of:
providing a filter system, comprising a housing, a support grid fixedly arranged in the housing, the support grid comprising a number of arms interconnected at nodes, a number of filter elements arranged on the nodes of the support structure, and cleaning elements movably arranged on the arms of the support grid between adjacent nodes; and cleaning of the support grid by vibration and movement of the cleaning elements.

The method may comprise the step of inducing the vibration and movement of the cleaning elements by dynamic fluid forces of the gas mixture.

In an embodiment, the method comprises the step of inducing the vibration and movement of the cleaning elements by a gas pulse through the filter elements for cleaning thereof, said gas pulse being adapted to activate the cleaning elements by kinetic energy.

The invention will be described hereinafter in more detail and by way of example, with reference to the accompanying drawings, in which:

FIG. 7 shows a side view in perspective of an embodiment of a cleaning device;

FIG. 8 shows a side view in perspective of yet another embodiment of a cleaning device;

FIGS. 9A and 9B show a perspective view of a support grid section provided with other embodiments of a cleaning device according to the disclosure;

Figure 1:
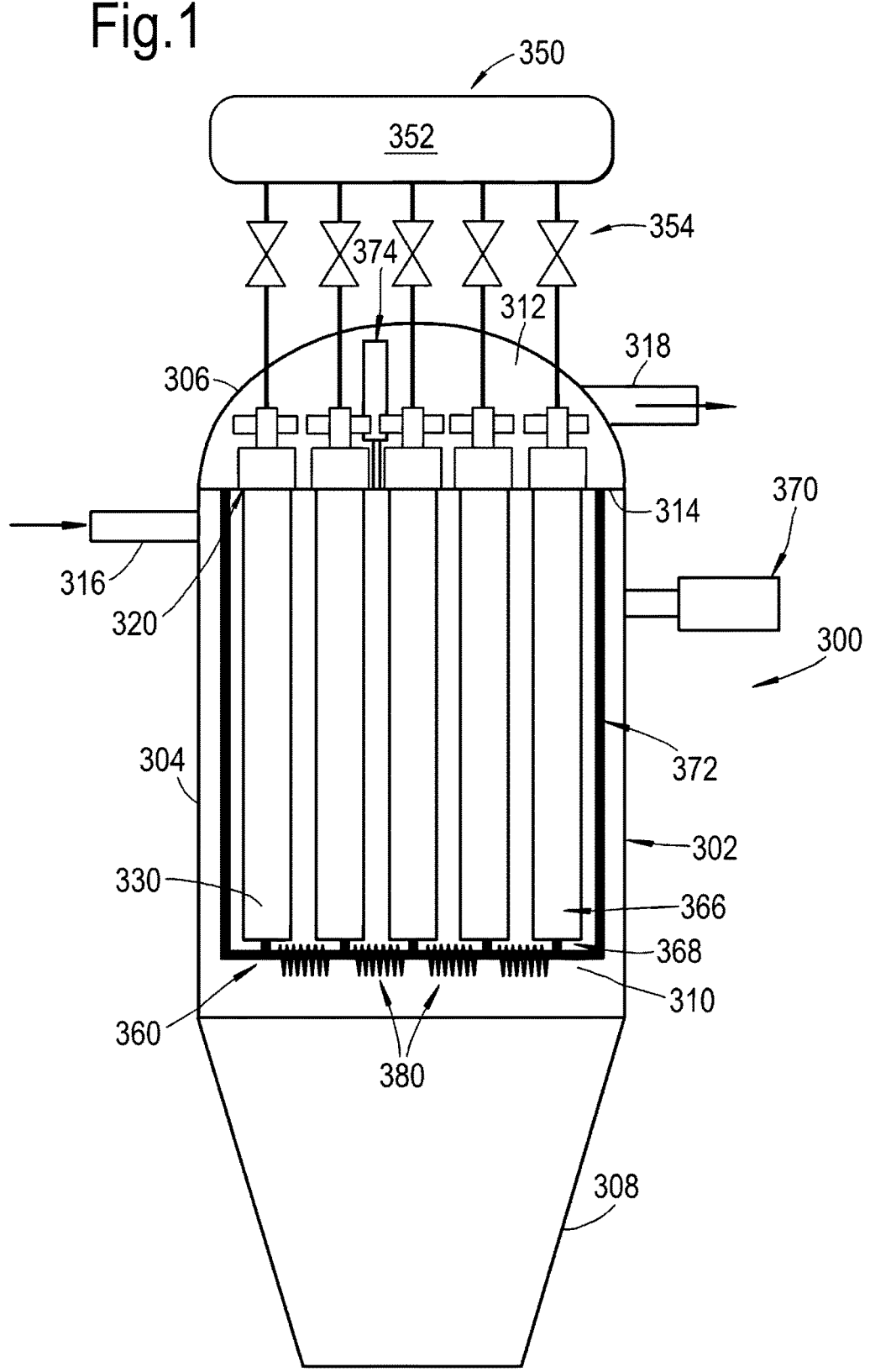
FIG. 1 shows a cross sectional view of a filter system for a gasification system including a support structure according to the disclosure.

FIG. 1 shows an example of a high-temperature and high-pressure fly ash filter system 300. The filter system 300 comprises a housing 302 which, for instance, comprises a cylindrical wall portion 304 which is closed at its upper end by a dome-shaped cover 306 and is connected at its lower end to a dust collector 308 with a conical shape.

The housing 302 may be divided into a raw gas chamber 310 and a clean gas chamber 312 by a tube sheet 314 which spans across the whole cross-section of the cylindrical wall portion 304 at its upper end.

The raw gas chamber 310 is accessible via a feed gas inlet 316 through which raw gas can be introduced into the raw gas chamber 310. The dome-shaped portion 306 of the housing 302 comprises a clean gas outlet 318 through which clean gas may be discharged. Please note that the gas flow may also be reversed, i.e. entering through conduit 318 and exiting through pipe 316.

The tube sheet 314 comprises a plurality of openings 320 which accommodate upper ends of a plurality of candle-shaped filter modules 330. The openings 320 may have any suitable shape to accommodate the filter modules, for instance round or rectangular. The filter modules may be suspended from the tube sheet 314. Each filter module 330 may comprise a plurality of candle-shaped filter elements (not shown). Bundling multiple filter elements in one filter module facilitates more efficient replacement thereof, for instance for maintenance.

In a practical embodiment, the tube sheet 314 is sufficiently strong to carry the combined weight of all the filter modules 330. The tube sheet may for instance be made of steel. The tube sheet may have a thickness in the order of 50 mm or more to provide the appropriate strength and bending stiffness.

A support grid 360 comprises a plurality of interconnected support beams 362, connected at nodes 364. Lower ends 366 of the filter modules 330 may be connected to the support grid. For instance, each lower end 366 may be connected to a respective node 364 of the support grid. Interconnect stubs 368 may connect the lower ends of the filter modules to the nodes. The grid 360 may have any suitable form, for instance rectangular (FIG. 2) or triangular (FIG. 3). One or more vertical columns 372 may connect the grid 360 to the tube sheet 314. The vertical columns can connect the grid directly to the tube sheet, to—at least to some extent—restrict vertical and horizontal movement of the support grid. Also, the vertical columns provide additional support and obviate stress on the filter elements of the filter modules 330.

The grid 360 may fixate horizontal movement of the lower ends of the filter modules with respect to each other, thus preventing the filter modules to engage and damage each other, for instance during or shortly after a cleaning pulse.

For regenerating the individual filter modules 330, the filter system 300 may include a back-pulsing system 350 comprising a pressure source 352 as well as a plurality of supply lines 354 which end within the dome-shaped cover 306 above the individual filter modules 330.

An alternative back-pulsing system may comprise conical gas domes above the tops of the filter modules. See for instance CN201329226 for an example.

Alternatively, or in addition, for regenerating the individual filter modules 330, the system may include one or more impact devices 370, 374. The impact device may provide an impulse, i.e. a mechanical impact, to the filter modules. The impact may be provided directly to (a part of) the filter modules, to the support grid 360, to the housing 302 and/or to the tube sheet 314. The impact device 370 may provide a pulse in horizontal direction. The impact device 374 may provide an impact in vertical direction. Providing an impact in vertical direction, for instance in the length direction of the filter elements, may be beneficial to limit strain on the filter elements within material limits of the filter elements.

By providing a gas pressure pulse using the back-pulsing system 350, or a gas cone structure as disclosed in CN201329226, ash and dust will be blown out of the filter modules 330, and will fall down due to gravity. Similarly, the mechanical impact provided by one or more of the impact devices 370, 374 excites vibrations in the filter modules 330 and the filter elements therein, which causes ash and dust in the filter modules to release the filter modules and/or elements and to fall down due to gravity. Part of the released ash and dust however may accumulate on the support grid 360.

According to the present disclosure, the support grid is provided with cleaning devices 380. The cleaning devices are adapted to remove at least part of the accumulated solids, such as ash and dust, from the support grid.

In an embodiment, the cleaning devices may be moveable along the support beams 362, between adjacent nodes 364.

The cleaning devices may include suitable flexible structures able to move along the support grid.

In an embodiment, the cleaning devices are springs, coiled around the grid 360. One or more sections of the grid 360, between respective nodes 364, may be provided with a separate spring.

Figure 2:
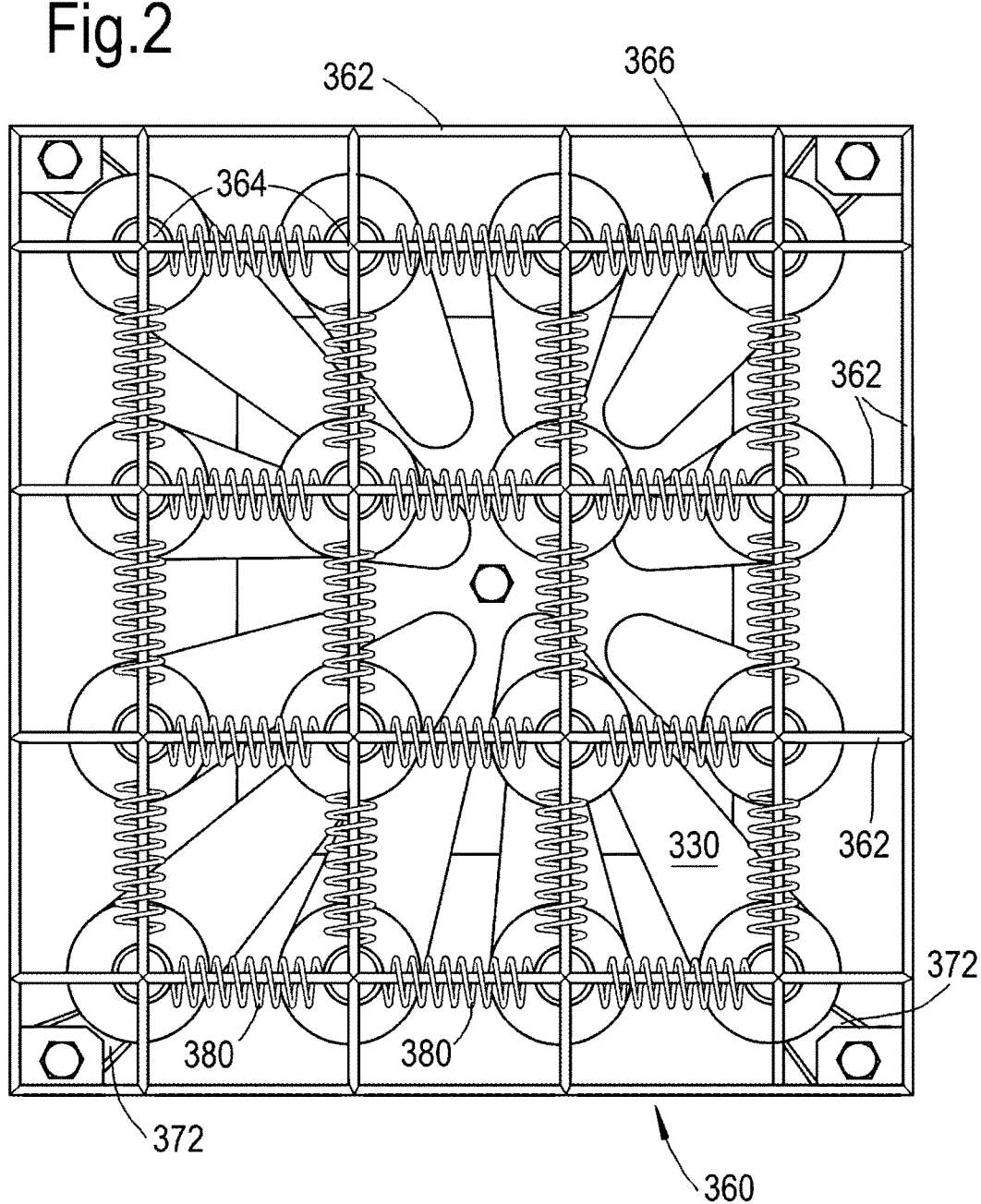
FIG. 2 shows a bottom view of an embodiment of a support structure according to the disclosure.
Figure 3:
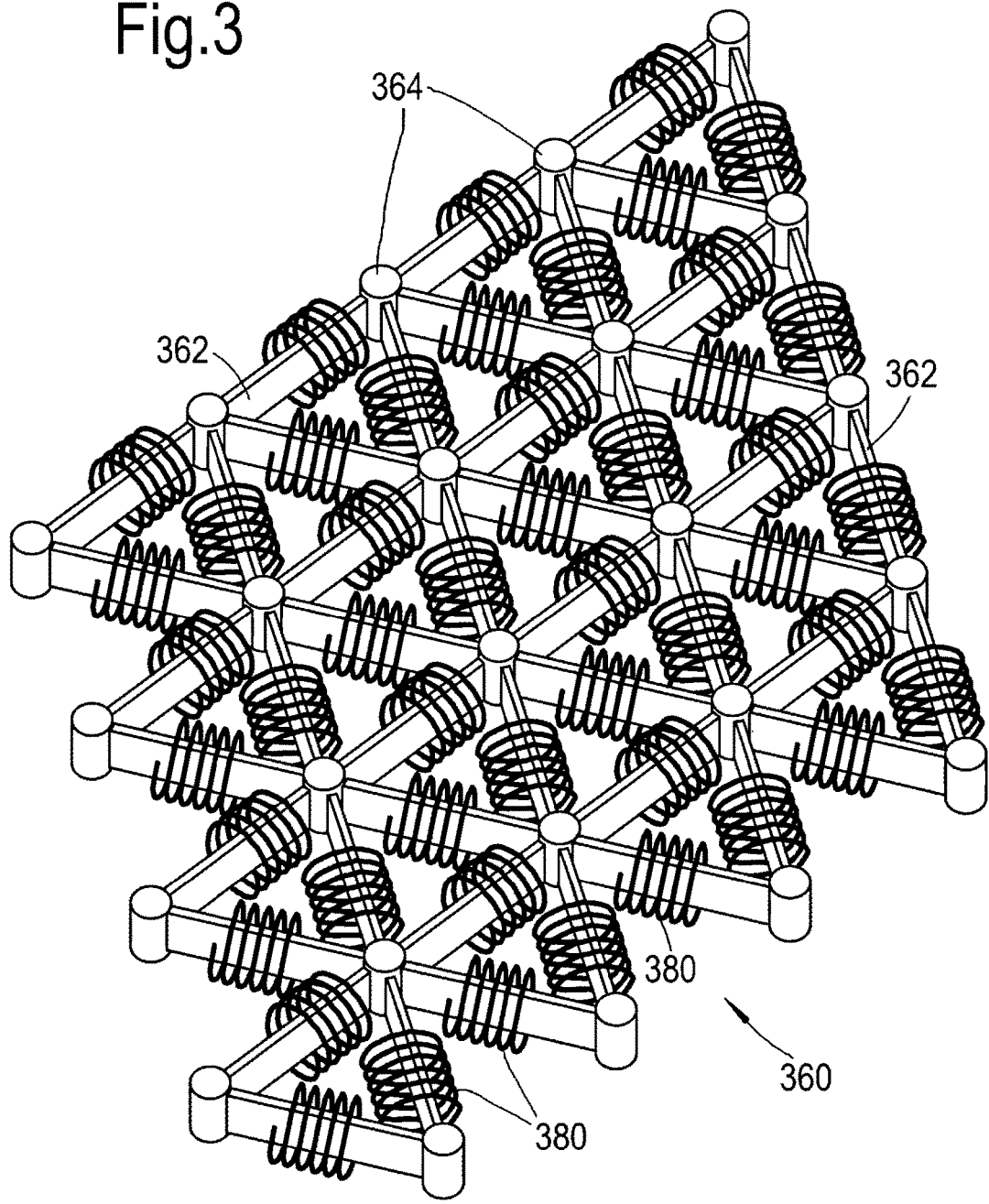
FIG. 3 shows a perspective view of another embodiment of a support structure according to the disclosure.

In a cost effective embodiment, the springs may be helical springs (FIGS. 1 to 3). The helical springs may have any number of windings, selected to provide the appropriate cleaning action in response to the kinetic energy available in the system. The vibrations in the structure suspended from the tube sheet 314 after a pressure pulse or other cleaning action will resonate to the grid 360. The vibrations will activate the cleaning devices, such as the springs 380 shown in FIGS. 1 and 2, which will move along or against their respective grid sections 362 and engage the accumulated dust. As the dust has a relatively loose and/or powdery structure, a relatively light touch of the cleaning devices will already remove at least part of the dust accumulation. The cleaning devices can be dimensioned such that the solids accumulation can be sufficiently limited to prevent blockage of the filter elements.

In cross-section, the helical springs may, for instance, be round, square, or rectangular. The cross-sectional shape of the cleaning devices may be selected to fit the outer cross-sectional shape of the support grid.

The grid support beams or cross links 362 may have a relatively thin and high shape, meaning that the height 392 thereof significantly exceeds the width 390. Optionally, the support beam may also be provided with a sharp or pointy top end 394. The thin grid section, as well as the sharp top end, limit the top surface of the grid section and thus also limit dust collection.

The nodes 364 shown in FIG. 3 have a substantially cylindrical shape in top view. The nodes may have any other suitable shape. The nodes may, for instance, have a hexagonal shape in top view, allowing each cross link 362 to be connected to a separate side surface of a node.

Figure 4:
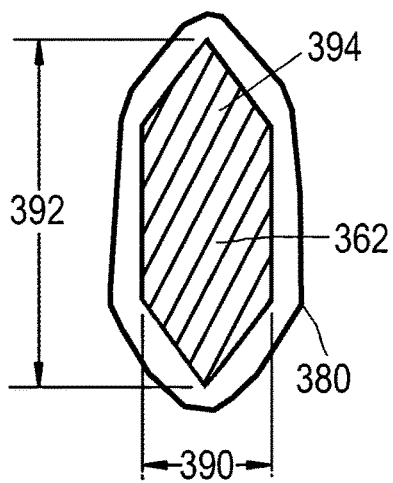
FIG. 4 shows a cross section of a support grid provided with an embodiment of a cleaning device according to the disclosure.

As shown in FIG. 4, the cross section of the cleaning device 380 may closely follow the outer surface of the respective grid beam. 362. Herein, the cleaning device 380 may be a helical spring. Alternatively, the cleaning device may comprise one, or a multitude of single windings movable along the grid beam 362.

In an embodiment (FIGS. 5 and 6), the cleaning device 380 comprises a spring type material wound around the grid beam 362. The cleaning device comprises a fixation section 400 which is connected to the grid beam 362. The fixation section s connected to one or more vibration elements or vibration extensions 410, 412.

Figure 5:
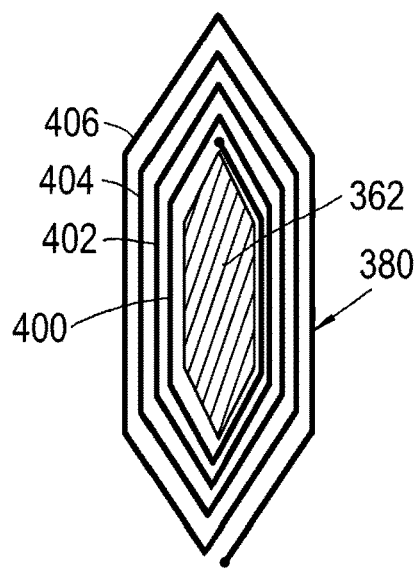
FIG. 5 shows a cross section of a support grid provided with another embodiment of a cleaning device according to the disclosure.
Figure 6:
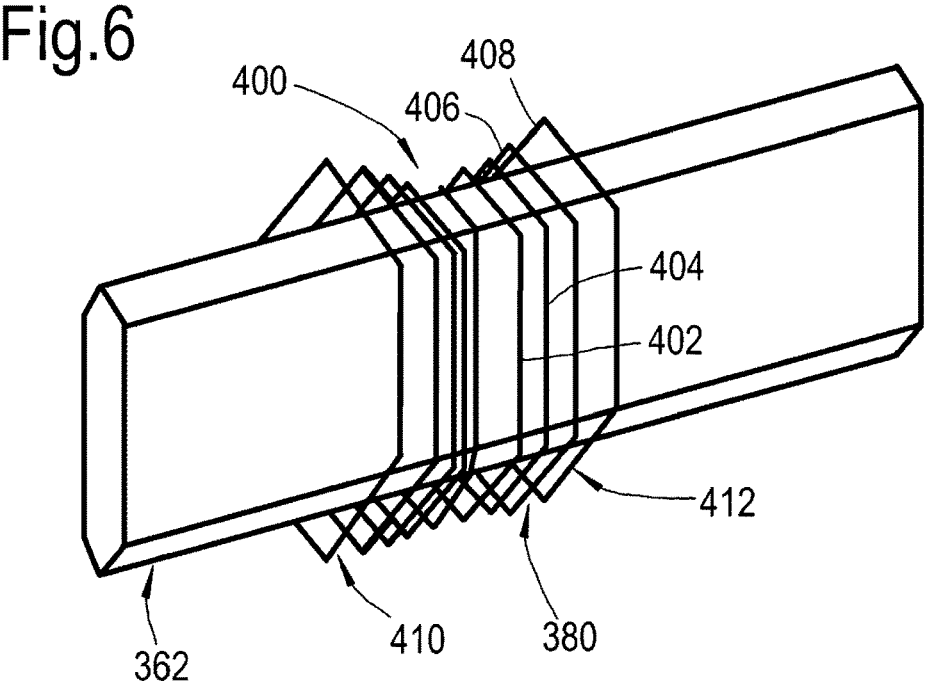
FIG. 6 shows a perspective view of the embodiment of FIG. 5.

As shown in FIGS. 5 and 6, the vibration extensions 410, 412 may comprise helical spring windings 402, 404, 406, 408 having a progressively increasing diameter respectively.

FIG. 7 shows an embodiment, wherein the cleaning element comprises a fixation section 400, connected to vibration extensions 410, 412. The cleaning element 380 has substantially elongate shape in cross section. The elongate shape may be particularly suitable to limit the width of the extensions 410, 412 to limit dust deposition on the cleaning element when it is in rest. At the same time, the height of the cleaning element 380 may significantly exceed the width to closely follow the external shape of the grid beam 362, while allowing sufficient space between the vibration extensions and the grid for relative movement of the former with respect to the latter. Compare to FIG. 4.

FIG. 8 shows an embodiment, wherein the cross sectional shape of the cleaning element is substantially circular or elliptical.

FIG. 9 shows an embodiment, wherein the fixation section 400 comprises a band 420. The band 420 is tightly wound around the grid beam section 362.

The vibration extensions 410 may have a first end 422 fixated between the band 420 and the grid section. The vibration extensions 410 may comprise elongate members 430, which extend along and can vibrate with respect to the surface of the grid 362. A second end 424 of the elongate member 430 may be provided with a weight or heavier section 432. The weights 432 may support or enhance the vibration response of the cleaning elements in reaction to vibration energy available in the filter system.

Each section of the grid may be provided with one or more, for instance two or three, of the elongate members 430. The elongate members 430 of the cleaning devices may extend along and near the top section 394 of the respective grid section 362.

The elongate member 430 may be a straight wire (FIG. 9A). Alternatively, the elongate member(s) 430 may be a curved or bended wire (FIG. 9B), enabling the elongate member to conform to the outer shape of the grid 362.

Figure 10:
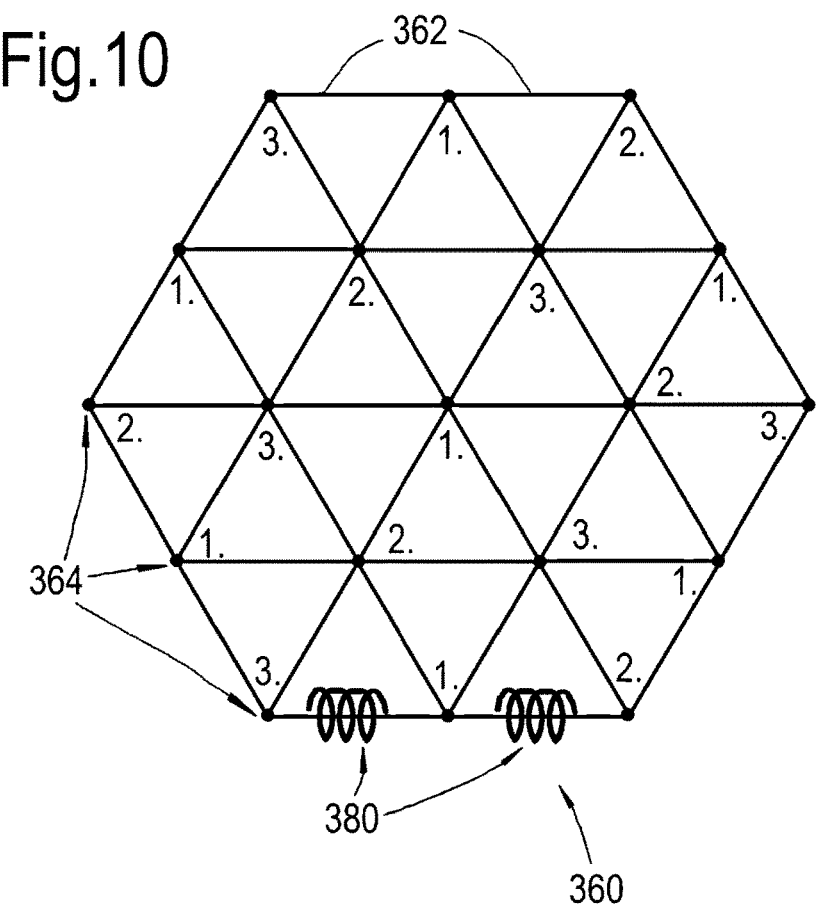
FIG. 10 shows a top view of a support grid provided with cleaning devices according to the disclosure.

FIG. 10 shows a top view of an embodiment of the support grid 360. Herein, adjacent nodes 364 are located at a different vertical level, schematically indicated with numbers to indicate, for instance three, different vertical levels 1., 2., and 3.

In the embodiment of FIG. 10, the support grid is triangular, and has nodes arranged at three different levels to ensure that all nodes 364 are at a different vertical level than any of the adjacent nodes. The latter ensures that the sections of the grid beams 362 interconnecting two adjacent nodes are sloping with respect to the horizontal plane 440. Other shapes of the grid, and more than three levels, or two different vertical levels, are also conceivable.

Figure 11:
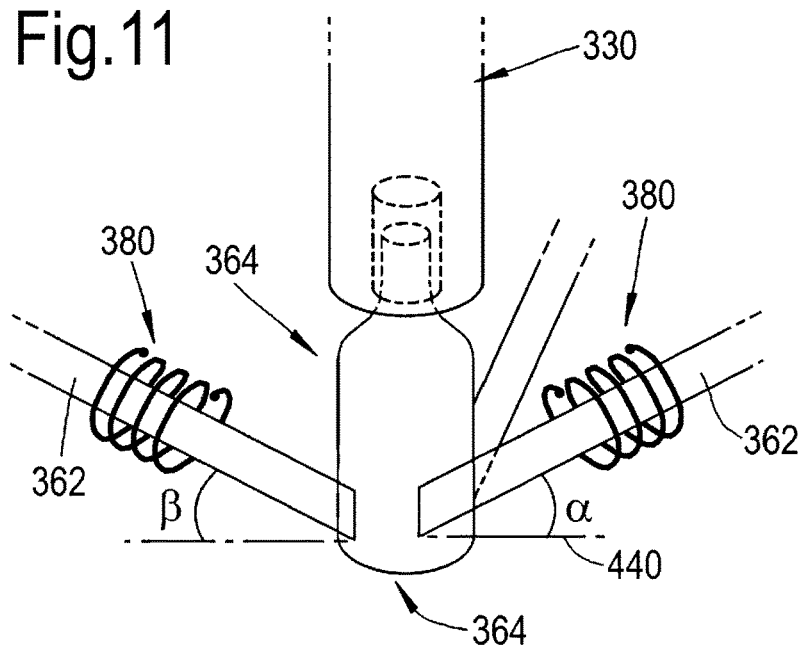
FIG. 11 shows a perspective view of a detail of the support grid of FIG. 10.

Due to the adjacent nodes being at a different vertical location, different sections of the beams 362 of the support grid are sloping with respect to the horizontal 440. Due to the multiple vertical levels, one beam section 362 can be at an angle $\alpha$, while another beam section can be at a different angle $\beta$ with respect to the horizontal plane 440 (FIG. 11).

The sloping beam sections ensure that cleaning devices 380, which are movably arranged around the respective beam sections, slide towards the lowest point of the beam section due to gravity. When vibrations in the filter systems excite the cleaning devices, the latter will vibrate and move along their respective beam sections, removing solids deposits while doing so. When vibrations stop, the cleaning devices will fall back to the lowest point. The embodiment in FIGS. 10 and 11 provides improved cleaning and dust removing action of the cleaning devices, such as the helical spring type, as they are forced to move along the beam sections due to gravity.

The system of the disclosure works by applying separate solid bodies around or on selected parts of the support structures, most prone to accumulation of the fly ash and/or dust. The cleaning bodies, for instance spiral springs, designed and positioned such that they vibrate and move constantly over areas susceptible to ash accumulation during normal operation. The vibrations and movements may be induced by dynamic fluid forces. The moving and vibrating cleaning devices 380 prevent the settling of ash and dust particles on the surfaces of the support grid 360. The cleaning devices move between respective nodes 364, and limit the accumulation of ash.

In addition to dynamic fluid forces, the cleaning devices 380 may be activated by vibration of the support grid triggered by, for instance, the impact from the impact device 370 and/or the gas pulse provided by the back-pulsing system 350.

The cleaning devices 380 allow to limit ash accumulation on the support grid to a threshold, by tuning one or more parameters from the group of, for instance: available kinetic energy by syngas flow; energy of the mechanical impact or gas pulses; vibrations resulting from the impact or pulse in the support grid; frequency of the impacts or pulses; time period of the gas pulses; and providing multiple mechanical impacts or gas pulses at a time, for instance a number of 2 to 10 impacts at a time.

In a practical embodiment, the cleaning device 380 may be made of relatively flexible wire material. The flexibility of the cleaning devices is preferably sufficient to allow the device to vibrate in response to the available energy in the system, while being sufficiently stiff and strong to remove the accumulated dust. Preferably, the material of the cleaning elements can withstand erosion from potentially erosive elements in the gas, such as H2S.

Depending on the composition of the gas and its corrosive components, material of the cleaning device 380 may be selected from, for instance, chrome-silicon spring steel [5160 (A689), composition 0.55-0.65% C, 0.75-1.00% Mn, 0.70-0.90% Cr], which relatively fatigue-resistant, and corrosion resistance spring-tempered stainless steel [(A666); 0.08-0.15% C, max. 2.00% Mn, 16.00-18.00% Cr, 6.00-8.00% Ni]. The material of the cleaning elements preferably is in the form of relatively thin wire, making it relatively flexible with respect to the grid section 362. Relatively, the spring constant of the wire material may be at least 100 times, but preferably at least 1000 times, smaller than the spring constant of the respective grid section.

By preventing the settling of ash and dust on the support grid, the initiation of the accumulation (collection, agglomeration) and growth of the ash and dust accumulation into larger lumps can be limited to a predetermined maximum, preventing blockage of the filter elements and obviating manual cleaning and the associated operational shutdown. The cleaning devices of the disclosure provide significant cost savings due to limited maintenance and prolonged continuous operation.

The present invention is not limited to the embodiments as described above, wherein various modifications are conceivable within the scope of the appended claims. Features of different embodiments may for instance be combined.

The invention claimed is:

1. System for filtering a gas-solids mixture, the system comprising:
    a housing;
    a separating body dividing the housing into a raw gas section and a clean gas section, the raw gas section being accessible via an inlet for the gas-solids mixture and the clean gas section comprising an outlet for discharging a cleaned gas;
    a number of filter elements suspended from the separating body;
    a support grid, the support grid comprising a number of arms interconnected at nodes, the lower ends of the filter elements being connected to the support grid;
    one or more cleaning elements movably arranged on the arms of the support grid between adjacent nodes for cleaning of the arms.

2. The system of claim 1, the cleaning elements being adapted to vibrate to remove accumulation of solids.

3. The system of claim 1, the cleaning elements comprising helical springs wound around the arms of the support grid.

4. The system of claim 3, the helical springs being round, square or rectangular in cross section.

5. The system of claim 3, subsequent windings of the helical springs having an increasing diameter.

6. The system of claim 1, comprising at least one impact device for providing a mechanical and/or hydraulic impulse to the filter elements for the removal of accumulated solids from a surface of the filter elements, said impulse being adapted to provide excitation energy causing vibration of the cleaning elements.

7. The system of claim 6, comprising a back-pulsing system for providing a gas pulse through the filter elements for cleaning thereof, said gas pulse being adapted to provide the hydraulic impulse.

8. The system of claim 1, the cleaning elements being adapted to limit accumulation of solids on the support grid to a maximum threshold level, by tuning one or more parameters selected from the group of: flow rate of the gas-solids mixture; energy of the mechanical and/or hydraulic impulse; vibrations in the support grid resulting from the impulse; frequency of repeating the mechanical and/or hydraulic impulse; number of mechanical and/or hydraulic impulses at a time; and time period of the mechanical and/or hydraulic impulse.

9. The system of claim 1, the cleaning elements comprising a fixation section for fixating the respective cleaning element with respect to the support grid, and one or more vibration extensions connected to the fixation section for vibrating with respect to the support grid.

10. The system of claim 9, the vibration extensions comprising helically wound sections.

11. The system of claim 10, the helically wound sections having an increasing diameter in a direction away from the fixation section.

12. The system of claim 10, the fixation section comprising a band.

13. The system of claim 12, the vibration extensions comprising elongate vibration elements, having a first end connected to the band.

14. The system of claim 13, an end of the elongate vibration elements being provided with a weight.

15. The system of claim 1 wherein the cleaning elements comprise a wire and are adapted to vibrate to remove accumulations of solids.

16. Method for filtering a gas mixture, the method comprising the steps of:
    providing a filter system, comprising a housing, a support grid fixedly arranged in the housing, the support grid comprising a number of arms interconnected at nodes, a number of filter elements arranged on the nodes of the support structure, and cleaning elements movably arranged on the arms of the support grid between adjacent nodes; and
    cleaning of the support grid by vibration and movement of the cleaning elements.

17. The method of claim 16, comprising a step of inducing the vibration and movement of the cleaning elements by dynamic fluid forces of the gas mixture.

18. The method of claim 16, comprising a step of inducing the vibration and movement of the cleaning elements by a gas pulse through the filter elements for cleaning thereof, said gas pulse being adapted to activate the cleaning elements by kinetic energy.

19. The method of claim 16 wherein the cleaning elements comprise a wire and are adapted to vibrate to remove accumulation of solids.

\* \* \* \* \*